United States Patent [19]

LaTulip

[11] Patent Number: 4,500,690

[45] Date of Patent: Feb. 19, 1985

[54] THERMOSETTING POLYMERS FROM AROMATIC ALDEHYDES, AZINES AND ISOPROPENYL PHENOLS

[75] Inventor: Randy J. LaTulip, Lake Jackson, Tex.

[73] Assignee: The Dow Chemical Company, Midland, Mich.

[21] Appl. No.: 609,156

[22] Filed: May 11, 1984

[51] Int. Cl.³ .................. C08G 14/06; C08G 14/12
[52] U.S. Cl. .................... 525/502; 525/504; 528/152; 528/157; 528/163; 528/245
[58] Field of Search .......... 528/159, 152, 163, 245; 525/502, 504

[56] References Cited

U.S. PATENT DOCUMENTS

| | | | |
|---|---|---|---|
| 2,631,140 | 3/1953 | Bloch ............................ | 528/152 X |
| 2,843,566 | 7/1958 | Christenson et al. ........ | 528/152 X |
| 2,948,702 | 8/1960 | Vogel et al. .................. | 528/152 X |
| 3,294,746 | 12/1966 | Farnham ....................... | 528/152 X |
| 3,516,971 | 6/1970 | Webb ............................ | 528/245 |
| 3,651,012 | 3/1972 | Holub et al. .................. | 528/502 X |
| 3,994,862 | 11/1976 | Ropars et al. ................ | 524/99 X |
| 4,163,740 | 8/1979 | Malassine et al. ........... | 524/548 X |
| 4,179,429 | 12/1979 | Hanauye et al. ............. | 528/152 X |
| 4,320,043 | 3/1982 | Anderson ..................... | 528/159 X |
| 4,362,860 | 12/1982 | Ratto et al. .................. | 528/248 |

*Primary Examiner*—Howard E. Schain
*Attorney, Agent, or Firm*—B. G. Colley

[57] ABSTRACT

Heat resistant thermosetting prepolymers are prepared by reacting one or more methylated pyridines or pyrazines with one or more aromatic dialdehydes, and isopropenyl phenols. The prepolymers can be further reacted with bismaleimides to make prepolymers with lower cure temperatures and faster cure rates. The total number of methyl groups on the pyridine or pyrazine can vary from 2 to 4. The prepolymers are cured to produce heat resistant polymers and laminates with conventional fibers such as carbon fibers.

10 Claims, No Drawings

THERMOSETTING POLYMERS FROM AROMATIC ALDEHYDES, AZINES AND ISOPROPENYL PHENOLS

BACKGROUND OF THE INVENTION

This invention relates to thermosetting polymers prepared from methylated pyridines or pyrazines, aromatic dialdehydes, isopropenyl phenols, and with or without bismaleimides.

In the aerospace and/or aircraft industry there is a need for light weight fire resistant polymeric composites for interior and exterior use. A recent development in this critical area was the discovery that composites based on polystyrylpyridines are useful in this field of endeavor. The key patents are outlined below.

It is known from U.S. Pat. No. 3,994,862 that polystyrylpyridine thermosetting prepolymers and cured polymers can be obtained by reacting methylated pyridines and aromatic dialdehydes.

U.S. Pat. No. 4,163,740 discloses the preparation of solutions of polystyrylpyridines in various organic solvents such as ethyl acetate, propanol, and methylethylketone.

U.S. Pat. No. 4,362,860 discloses related polystyrylpyridines terminated with vinyl pyridine.

SUMMARY OF THE INVENTION

It now has been found that heat resistant thermosetting prepolymers can be prepared by reacting one or more aromatic dialdehydes, one or more azine compounds having the formula

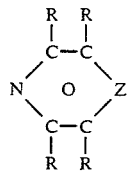

where Z is N, C—CH$_3$, C—CH$_2$—CH$_3$ or C—H R is hydrogen, methyl, or ethyl, whereby the total number of methyl groups substituted on the ring is in the range from 2–4, and monomeric para or meta isopropenyl phenols having the formula

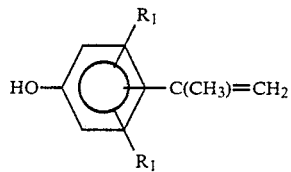

wherein R$_1$ is hydrogen or a group inert to the polymerization reaction such as hydroxy, halogen, nitro, or amino groups, the dimers thereof, or mixtures of the monomers and dimers.

These thermosetting polymers are useful to make high temperature resistant composites with fiber glass, carbon fibers and the like. The advantage of this invention is that the prepolymers made herein cure at lower temperatures and faster than the known uncapped polystyrylpyridine prepolymers. Additionally, the cured polymers obtained in accordance with the methods described in this invention posses superior ablative properties as seen by their very high chara yields.

A preferred embodiment of the invention is to further react the prepolymer prepared above with a bismaleimide compound having the formula

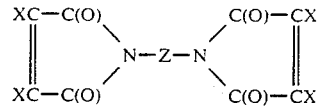

where Z is a divalent organic radical having at least one carbon atoms and selected from the group consisting of aliphatic groups, alicyclic groups, aromatic groups, and groups having at least two aryl residues or cyclohexyl residues bonded together by methylene, sulfonyl, or oxygen linkages. X is independently hydrogen, halogen, an alkyl group of 1–4 carbons or an aryl group of 6–8 carbons.

DESCRIPTION OF THE PREFERRED EMBODIMENTS

The prepolymers of this invention are prepared by reacting alkylated azine compounds such as methyl pyridines and methyl pyrazines with aromatic dialdehydes in the presence of an acidic catalyst. After formation of oligomers, monomeric or dimeric isopropenyl phenols are added to cap the oligomers.

The azine compounds and the aldehydes are heated to a temperature in the range from about 130° to about 230° C., preferably in the range from 170° to 190° C. for a period of time from 0.5 to 6 hours and preferably 1 to 2 hours. The reaction is conducted in the absence of oxygen and suitably with a nitrogen purge.

Useful catalysts that can be used are sulfuric acid, hydrochloric acid, zinc chloride, acetic anhydride, aluminum trichloride, toluene disulfonic acid, trichloro acetic acid, and acetic acid. The catalysts are used in amounts from 0.5 to 20 weight percent based on the total weight of the reactants and preferably in amounts from 2 to 5 weight percent. It is to be understood that the reaction can proceed in the absence of catalyst but the reaction time is much longer.

Examples of useful pyridines are 2,3-dimethyl pyridine, 2,4-dimethyl pyridine, 2,5-dimethyl pyridine, 2,6-dimethyl pyridine, 3,4-dimethyl pyridine, 3,5-dimethyl pyridine, 3,5-dimethyl-2-ethyl pyridine, 2,3,4,6-tetramethyl pyridine, 2,3,5-trimethyl pyridine, 2,3,6-trimethyl pyridine, 2,4,5-trimethyl pyridine and 2,4,6-trimethyl pyridine.

Examples of useful mononuclear aromatic dialdehydes have the formula:

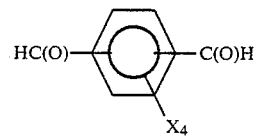

wherein X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons or an oxyaryl group of 6–8 carbons.

Preferred compounds within the scope of the above formula are terephthalic aldehyde, phthalic aldehyde, isophthalic aldehyde.

Examples of useful pyrazines are 2,5-dimethyl pyrazine, 2,3-dimethyl pyrazine, 2,5-dimethyl pyrazine, 2,3,5-trimethyl pyrazine and 2,3,5,6-tetramethyl pyrazines.

Examples of useful bismaleimides are N,N'-ethylenebismaleimide, N,N'-ethylenebis(2-methylmaleimide), N,N'-trimethylene bismaleimide, N,N'-tetramethylene bismaleimide, N,N'-hexamethylene bismaleimide, N,N'-1,4-cyclohexylene bismaleimide, N,N'-m-phenylene bismaleimide, N,N'-p-phenylene bismaleimide, N,N'-2,4-tolylene bismaleimide, N,N'-2,6-tolylene bismaleimide, N,N'-(oxydi-p-phenylene)-bismaleimide, N,N'-(oxydi-p-phenylene)bis(2-methylmaleimide), N,N'-(methylenedi-p-phenylene)bismaleimide, N,N'-(methylenedi-p-phenylene)-bis(2-methylmaleimide), N,N'-(methylenedi-p-phenylene)bis(2-phenylmaleimide), N,N'-(sulfonyldi-p-phenylene)bis-maleimide, N,N'-(thiodi-p-phenylene)bismaleimide, N,N'-(dithiodi-p-phenylene)-bismaleimide, N,N'-(sulfonyldi-m-phenylene)bismaleimide, N,N'-(o,p-isopropylidenediphenylene)bismaleimide, N,N'-(isopropylidenedi-p-phenylene)bismaleimide, N,N'-(o,p-cyclohexylidenediphenylene)bismaleimide, N,N'-(m-xylene)bismaleimide, N,N'-(p-xylylene)bismaleimide, N,N'-(4,4-p-triphenylene)bismaleimide, N,N'-(p-phenylenedioxydi-p-phenylene)bismaleimide, N,N'-(methylenedi-p-phenylene)bis(2,3-dichloromaleimide), and N,N'-(oxydi-p-phenylene)bis(2-chloromaleimide).

The bismaleimides can be used in a weight ratio range of from one weight maleimide to 4 of prepolymer and 4 weight units of maleimide to one of prepolymer.

The use of the bismaleimides in this invention gives prepolymers that cure at lower temperatures and at a faster rate.

It is to be understood that the foregoing reactants can be used alone or in combination as in an initial mixture of each or by the sequential addition during the reaction to achieve beneficial results.

The molar ratio range of this aldehyde to the azine compounds can be from about 0.2:1 to about 4:1 and preferrably in the range of 0.66:1 to 1.5:1.

The molar ratio range of the isopropenyl phenol or dimers thereof to the azine compounds can be from about 0.05:1 to about 4:1 and preferably in the range of 0.2:1 to about 1:1.

The prepolymer (oligomer or resin) initially obtained is cured by press molding at a temperature range of about 150° to 300° C. for a time of 1 to 8 hours. The resultant semicured polymer is further cured at a temperature range of about 250° to 300° C. for a time of 2 to 10 hours to obtain the final fire resistant molding.

Composites are made by adding heat resistant fibers to the prepolymer before the press molding. Examples of useful heat resistant fibers to be used herein are graphite fibers, fiber glass, aramid fibers, asbestos fibers, and the like.

The following examples are presented to further illustrate but not limit the invention.

EXAMPLE I 174.6 grams (1.3 moles) of terephthalaldehyde and 163.5 (1.35 moles) of 2,4,6-trimethylpyridine were placed in a 500-cc glass resin kettle equipped with a mechanical stirrer, modified Dean-Start apparatus for collection of water, infrared heating lamps, thermometer, and nitrogen purge system. The resin kettle was purged with nitrogen for 5 minutes and the IR lamps turned on. At a 90° C. pot temperature the terephthalaldehyde began to melt. The mechanical stirrer was started and a 5 to 15-cc/min $N_2$ purge maintained. At a 110° C. pot temperature 5 cc of concentrated sulfuric acid was added. The reaction mixture was heated to 160° C. for 1½ hours, collecting $H_2O$ overhead. 43.0 grams (0.35 moles) of p-isopropenyl phenol was added and the reaction mixture maintained at 150°–160° C. for 1½ hours. The reaction mixture was then cooled to room temperature, washed with acetone and methanol, filtered, and dried in a vacuum oven at 90° C. and 30" Hg vacuum for 45 minutes.

Prepolymer properties: Melting Point—130°–170° C.; IR-hydroxy function—3100–3600 $cm^{-1}$; Isopropenyl function—885–900 $cm^{-1}$; GPC—molecular weight—900 $M_n$, 2000 $M_2$.

12.5 grams of the prepolymer was compression molded at 204°–220° C. and 500 psi for 1 hour. The cured block sample obtained after pressing was post cured in an atmospheric oven at 240° C. for four hours. Properties of the cured material are as follows:

Glass Transition Temperature $(T_g)$=320° C. by DMA.

Thermal Stability by Thermal Gravimetric Analysis (TGA): 5% wt loss in nitrogen and air at 500° C., 75% char yield in nitrogen @950° C.

EXAMPLE II 7.0 grams of N,N'-methylenedi-p-phenylenebismaleimide was mixed with 7.0 grams of the prepolymer prepared as described in Example I. The prepolymer mixture was compression molded in a 2"×2" plate at 180° C. and 500 psi for 1 hour. The cured copolymer block sample was post cured in an atmospheric oven at 240° C. for 4 hours. Properties of the cured material are as follows:

Tg by DMA=315° C.

Thermal Stability (TGA)=5% wt loss in $N_2$=460° C., 5% wt loss in air=450° C., 63% char yield in $N_2$ @950° C.

EXAMPLE III

Isopropenyl capped polystyrylpyridine powder from Example I and N,N'-methylenedi-p-phenylenebis maleimide powder were blended together in a ratio of 1/1 by weight. 4.4 grams of this material was alternated with 3⅞" squares of glass cloth in a mold which had a cavity of 4"×4"×⅛". The glass cloth weighed 2.92–2.96 grams per piece and seven pieces were used before the top plate of the mold was positioned in place. The mold was placed in a heated press and the resin was cured for 2 hours at 900 p.s.i. and 180° C. A rigid, dark brown composite was obtained which did not support combustion when exposed to an open flame.

EXAMPLE IV 153.5 grams (1.15 mole) of terephthalaldehyde and 103 grams (0.75 mole) of 2,3,5,6-tetramethylpyrazine were placed in a 500 cc glass resin kettle equipped with a mechanical stirrer, modified Dean-Stark apparatus for collection of water, infrared heating lamps, thermometer, and nitrogen purge system. The infrared lamps were turned on and a 5–10 cc/min nitrogen purge was initiated. At a 105° C. pot temperature the reactants had melted and the mechanical stirrer was started. Approximately 5 cc of concentrated sulfuric acid was added and the reaction mixture was heated to 160°–170° C. for 1 hour, collecting water overhead. The reaction mixture was then cooled to 150° to 158° C. and 48.2 grams of para-isopropenyl phenol was added dropwise as a 50/50 by weight solution in acetone. The reaction mixture was maintained at 150°–158° C. for 45 minutes before cooling to room temperature. The prepolymer was purified by dissolving in a 50/50 THF/acetone mixture and precipitating in water. The precipitated prepolymer was then filtered and dried in a vacuum oven.

Prepolymer Properties: melting point=175°–185° C.; IR absorbtions=3100–3000 cm$^{-1}$ Hydroxy, 885–900 cm$^{-1}$ Isopropenyl; GPC wt. average mol. wt=4800. 51.5 grams of the prepolymer was compression molded at 210° to 230° C. and 500 psi for 1 hour in a 4"×4"×⅛" plate. The sample was then post cured at 230° C. for 12 hours in an atmospheric oven. Properties of the cured material are as follows:

Glass transition temp. (Tg)=>380° C. by DSC.

Thermal stability (TGA)=67% char yield in nitrogen at 950° C.

I claim:

1. A thermosetting prepolymer which comprises the resinous reaction product of
   (A) one or more aromatic dialdehydes,
   (B) one or more azine compounds having the formula

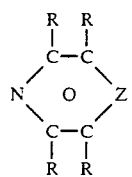

where Z is N, C—CH$_3$, or C—CH$_2$—CH$_3$, or C—H R is hydrogen, methyl, or ethyl, whereby the total number of methyl groups substituted on the ring is in the range from 2–4, and
   (C) a member of the group consisting of (1) monomeric para or meta ispropenyl phenols having the formula

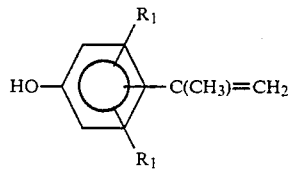

wherein R$_1$ is hydrogen, or a group inert to the polymerization reaction, (2) dimers of said phenols, and (3) mixtures thereof.

2. The prepolymer of claim 1 wherein said azine compound is 2,4,6-trimethyl pyridine, 2,6-dimethyl pyridine, or a mixture thereof.

3. The prepolymer of claim 1 wherein said azine compound is 2,5-dimethyl pyrazine, 2,3,5,6-tetramethyl pyrazine, or a mixture thereof.

4. The prepolymer of claim 1 wherein said dialdehyde has the formula

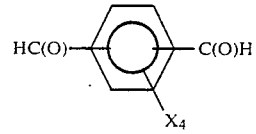

wherein X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons or an oxyaryl group of 6–8 carbons.

5. The thermosetting prepolymer which comprises the product of claim 1 further reacted with a bismaleimide compound having the formula

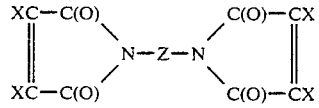

where Z is a divalent organic radical having at least two carbon atoms and selected from the group consisting of aliphatic groups, alicyclic groups, aromatic groups and groups having at least two aryl residues or cyclohexyl residues bonded together by methylene, sulfonyl, or oxygen linkages or combinations thereof and X is independently hydrogen, halogen, an alkyl group of 1–4 carbons or an aryl group of 6–8 carbons.

6. A cured composite which comprises the product obtained by heat curing the product of claims 1, 2, 3, 4, or 5 with heat resistant fibers.

7. The cured composite of claim 6 wherein the heat curing is conducted at a temperature in the range from about 150° to about 300° C. for a time sufficient to obtain a cure.

8. A thermosetting prepolymer which comprises the resinous reaction product of
   (A) terephthalaldehyde,
   (B) 2,4,6-trimethyl pyridine, and
   (C) p-isopropenyl phenol or a dimer thereof.

9. The prepolymer of claim 8 further reacted with N,N'-methylenedi-p-phenylene bismaleimide.

10. A cured composite which comprises the product obtained by curing the prepolymer of claim 9 with heat resistant fibers.

* * * * *